Apr. 17, 1923.

W. M. SHIRLEY 1,452,316

DIFFERENTIAL GEAR

Filed March 11, 1922

Inventor
W. M. Shirley,

By

Attorney

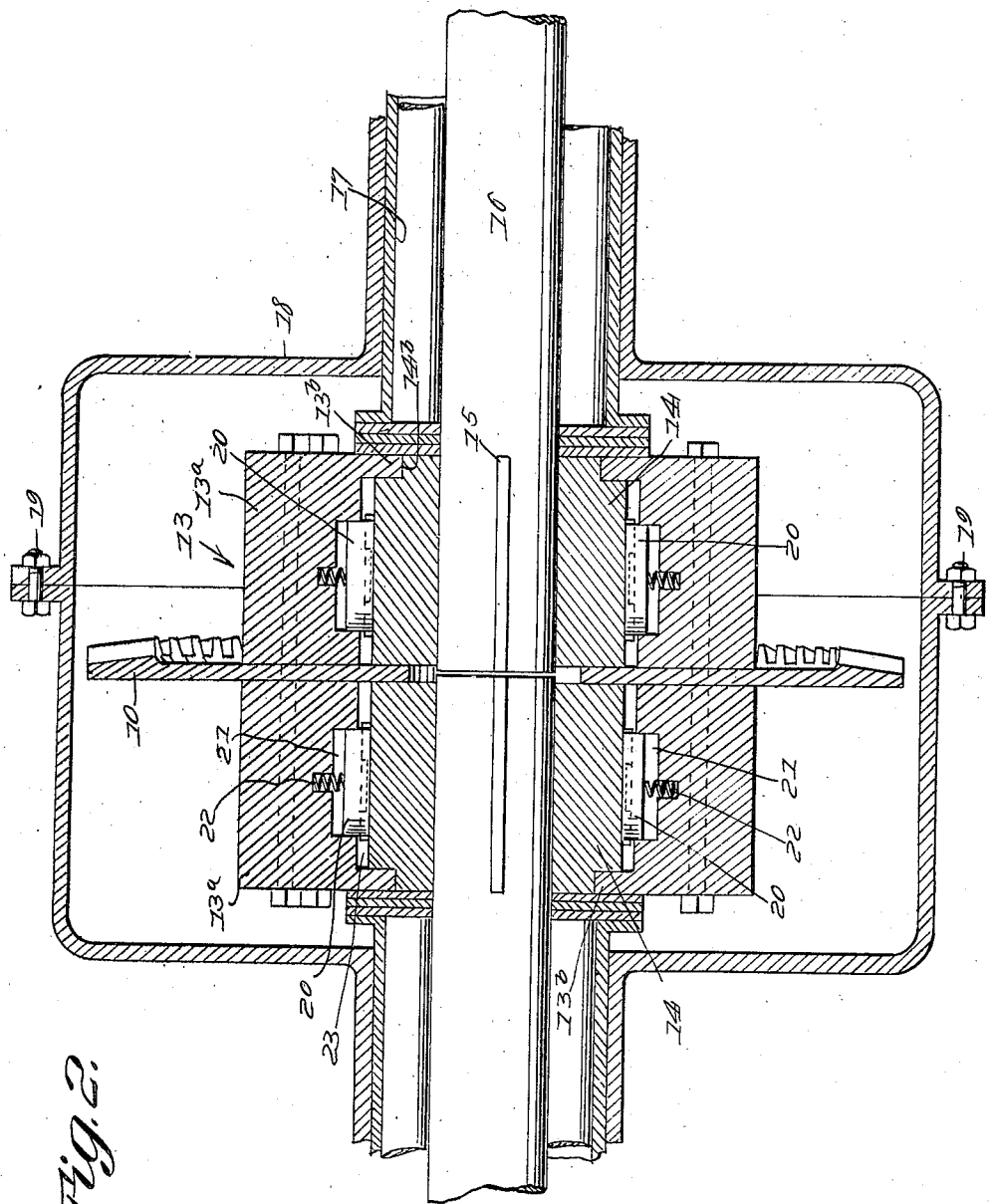

Apr. 17, 1923. 1,452,316
W. M. SHIRLEY
DIFFERENTIAL GEAR
Filed March 11, 1922 3 Sheets-Sheet 3
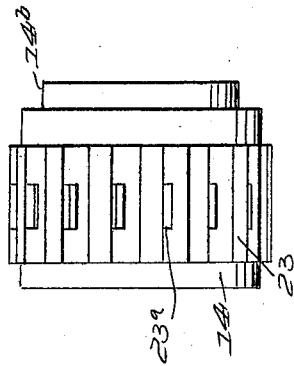
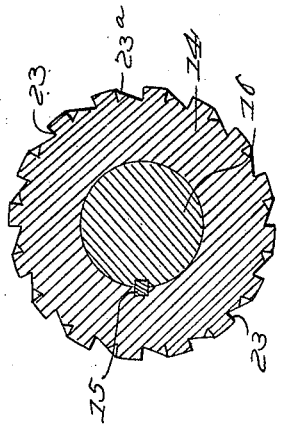
Inventor
W. M. Shirley,
By
Attorney Patented Apr. 17, 1923.

1,452,316

UNITED STATES PATENT OFFICE.

WILLIAM M. SHIRLEY, OF ALICEVILLE, ALABAMA.

DIFFERENTIAL GEAR.

Application filed March 11, 1922. Serial No. 542,921.

*To all whom it may concern:*

Be it known that I, WILLIAM M. SHIRLEY, a citizen of the United States of America, residing at Aliceville, in the county of Pickens and State of Alabama, have invented new and useful Improvements in Differential Gears, of which the following is a specification.

The object of the invention is to provide a simple, strong and relatively inexpensive and practical form of differential gear for use in connection with motor cars, trucks and the like as a substitute for the conventional forms of differentials, such as those of the spider type, now commonly used and which are open to objection by reason of the plurality of gears required in the construction thereof, and the relative difficulty in adapting and positioning them to properly perform their intended functions; and with this object in view the invention consists in a construction and combination of parts of which a preferred embodiment is shown in the accompanying drawings, wherein:—

Figure 2 is a sectional view taken axially through the gear.

Figure 3 is a vertical sectional view through one of the operating clutch members in the plane of the reverse ratchet teeth.

Figure 4 is an elevational view of one of the operating clutch members.

Figure 5 is a perspective view of one of the reverse pawls.

Figure 6 is a perspective view of one of the drive pawls.

Figure 7 is an end view of the pawl shown in Figure 5.

Figure 8 is an elevational view of the pawl shown in Figure 6.

Figure 1:
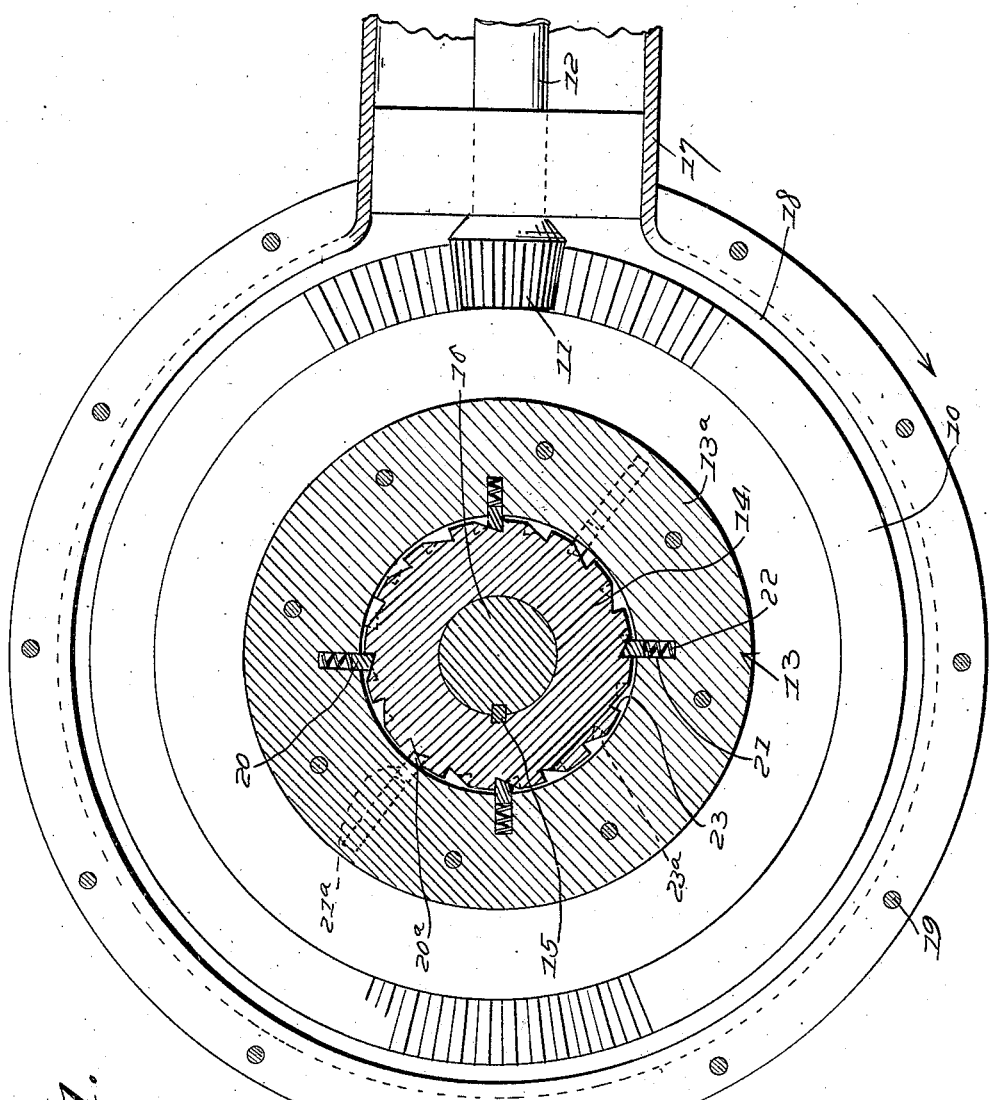
Figure 1 is a side view with the adjacent portions of the casing omitted of a differential embodying the invention.

The essential features of the device are a main or ring gear 10 actuable by a drive pinion 11 carried by the drive shaft 12 or its equivalent, carrying an operating clutch member 13 for communicating motion to operated clutch members 14 which are respectively keyed as at 15 to the axle shaft-members 16.

In the construction illustrated the axle shaft members are arranged as in the ordinary practice in the hollow axle 17 to which is attached a casing or housing 18 preferably of sectional form with the parts thereof connected by the bolts 19 so as to give access to the differential gear for adjustment and repair, and the gear embodying the invention may be arranged in the ordinary differential casing or housing and therefore used in connection with the elements of the drive wheel axle shaft as now constructed and used.

Moreover in the construction illustrated the means for communicating motion from the operating to the operated members of the clutch consists of drive pawls 20 mounted for radial movement in guides 21 in the operating member and yieldingly held in engaging position by coiled springs 22 or their equivalents, and ratchet faces 23 on the operated members for engagement by said pawls. These drive pawls or means for communicating forward motion from the operating to the operated clutch members are supplemented by reverse members consisting of pawls 20$^a$ disposed in the opposite relation to the drive pawls and mounted in guides 21$^a$ for engagement with reverse ratchet teeth 23$^a$ on the operated clutch members, said reverse pawls being movable radially in operative relation with or disengagement from the complemental ratchet teeth by centrifugal action during the forward or driving movement of the differential so that they are not in the position of dragging upon the teeth of the complemental ratchet faces during the forward movement of the car. Obviously when the car is reversed the drive pawls drag on the complemental ratchet teeth but while it is possible to omit springs or other yielding means for holding the reverse pawls in operative position, it is desirable to insure the engagement of the drive pawls by the use of springs or the equivalents thereof.

The main or ring gear 10 is shown in the drawing as interposed between separable elements 13$^a$ of the operating clutch member with the inner edge thereof interposed between and serving as a spacing member for the adjacent extremities of the operated clutch members 14, the operating clutch member having terminal inwardly directed bearing flanges 13$^b$ fitted in bearing channels 14$^b$ at the outer ends of the clutch members 14, but in connection with automobiles the main or ring gear may be attached to one end of the operating clutch member.

The arrangement shown in the drawing is essentially adapted for use in connection with trucks.

Having described the invention, what is claimed as new and useful is:—

1. A differential for drive wheel shaft members having a main gear actuable by the motor drive shaft, an operating clutch member carried by the main gear, operated clutch members fixed respectively to the drive wheel shaft members for receiving motion from the operating clutch member, and driving and reverse pawls carried by the operating clutch member for engagement with the complemental ratchet faces on the operated clutch members, the driving pawls being yieldingly engaged with the operated clutch members and the reverse pawls being automatically maintained out of engagement with said members when the driving pawls are operative.

2. A differential for drive wheel shaft members having a main gear actuable by the motor drive shaft, an operating clutch member carried by the main gear, and operated clutch members fixed respectively to the drive wheel shaft members for receiving motion from the operating clutch member, driving and reverse pawls being carried by the operating clutch members for engagement with complemental ratchet faces on the operated clutch members, the reverse pawls being centrifugally movable to inoperative positions.

3. A differential for drive wheel shaft members having a main gear actuable by the motor drive shaft, an operating clutch member carried by the main gear, operated clutch members fixed respectively to the drive wheel shaft members for receiving motion from the operating clutch member, and driving and reverse pawls carried by the operating clutch member for engagement with complemental ratchet faces on the operated clutch members, the operating clutch member comprising separable elements disposed on opposite sides of said main gear which serves as a spacing member for the adjacent extremities of the operated clutch members, the elements of the operating clutch member having inwardly directed flanges fitted in bearing channels at the outer end of the operated clutch members.

In testimony whereof he affixes his signature.

WILLIAM M. SHIRLEY.